Figures 1, 2:
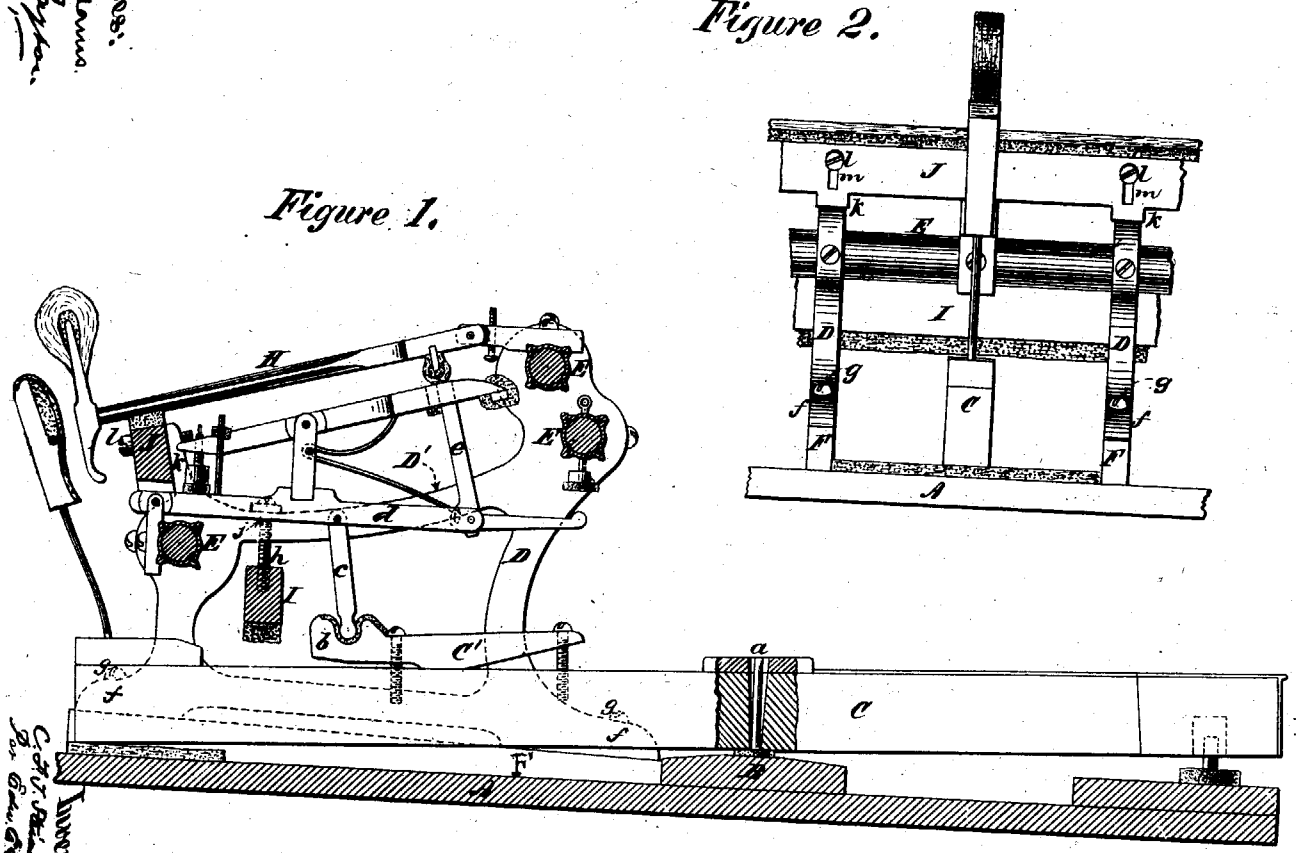

2 Sheets—Sheet 1.

C. F. T. STEINWAY,

Assignor, by mesne assignments, to himself and W. STEINWAY.

Piano-Forte Action.

No. 9,013. Reissued Dec. 30, 1879.

Witnesses:
M. L. Adams.
Edwd Paxton.

Inventor:
C. F. T. Steinway
Per Edw. G. Ewing
atty

C. F. T. STEINWAY,

Assignor, by mesne assignments, to himself and W. STEINWAY.

Piano-Forte Action.

No. 9,013. Reissued Dec. 30, 1879.

Witnesses:
M. L. Adams.
Edw. E. Purdon

Inventor:
C. F. T. Steinway
Per Edw. E. Purdon
Atty.

UNITED STATES PATENT OFFICE.

CHRISTIAN F. T. STEINWAY, OF NEW YORK, N. Y., ASSIGNOR, BY MESNE ASSIGNMENTS, TO HIMSELF AND WILLIAM STEINWAY.

IMPROVEMENT IN PIANO-FORTE ACTIONS.

Specification forming part of Letters Patent No. 93,647, dated August 10, 1869; Reissue No. 9,013, dated December 30, 1879; application filed October 29, 1879.

*To all whom it may concern:*

Be it known that I, CHRISTIAN F. T. STEINWAY, of the city, county, and State of New York, have invented certain new and useful of Improvements in Piano-Forte Actions, of which the following is a specification.

My improvements relate to piano-forte actions, and also to that class of action-frames in which the horizontal pieces of the frame are secured at intervals to transverse metallic standards, which are introduced into the frame at convenient distances apart, for the purpose of making the horizontal pieces mutually support each other, and for giving to the frame as a whole the inherent qualities of rigidity and strength.

Letters Patent No. 81,306, granted to me August 18, 1868, show and describe a frame of this class which is hung at the top to the wrest-plank of an upright piano-forte.

My present improvements embrace modifications in the construction of the frame which permit it to be supported and fastened at the bottom only, and hence adapt it for use in grand piano-fortes.

That part of my present invention which relates to the action-frame consists in providing the transverse metallic standards with feet, by means of which they can be fastened at the bottom, and in inserting beneath each standard and the key-frame a wedge for facilitating the vertical adjustment of the action-frame, in order to bring the hammers into the proper position with relation to the strings.

A further improvement in the frame consists in providing the inner ends of the standards, respectively, with upwardly-projecting arms, to which the hammer-rail is adjustably secured.

Those portions of my invention which relate to the action consist, first, in providing the lower end of the pilot, which is hinged at its upper end to the intermediate balance-lever of the action, with a rounded foot, and in providing in the bearing-piece affixed to each key a concave socket for receiving the foot of the pilot.

By this mode of construction the action-frame, together with the various trains of mechanism composing the action, may be readily removed and replaced without disturbing the keys, and on the other hand, by lifting either pilot out of its socket, the corresponding key can be removed and replaced without disturbing the action; thereby the adjustment of the action and the keys is materially facilitated.

The second feature of this part of my invention consists in the arrangement of adjusting-screws in the standards of the metallic action-frame, in combination with the rail which limits the stroke of the keys, for the purpose of raising or lowering the said rail, so that the stroke of the keys can be regulated to suit the player.

Figure 3:
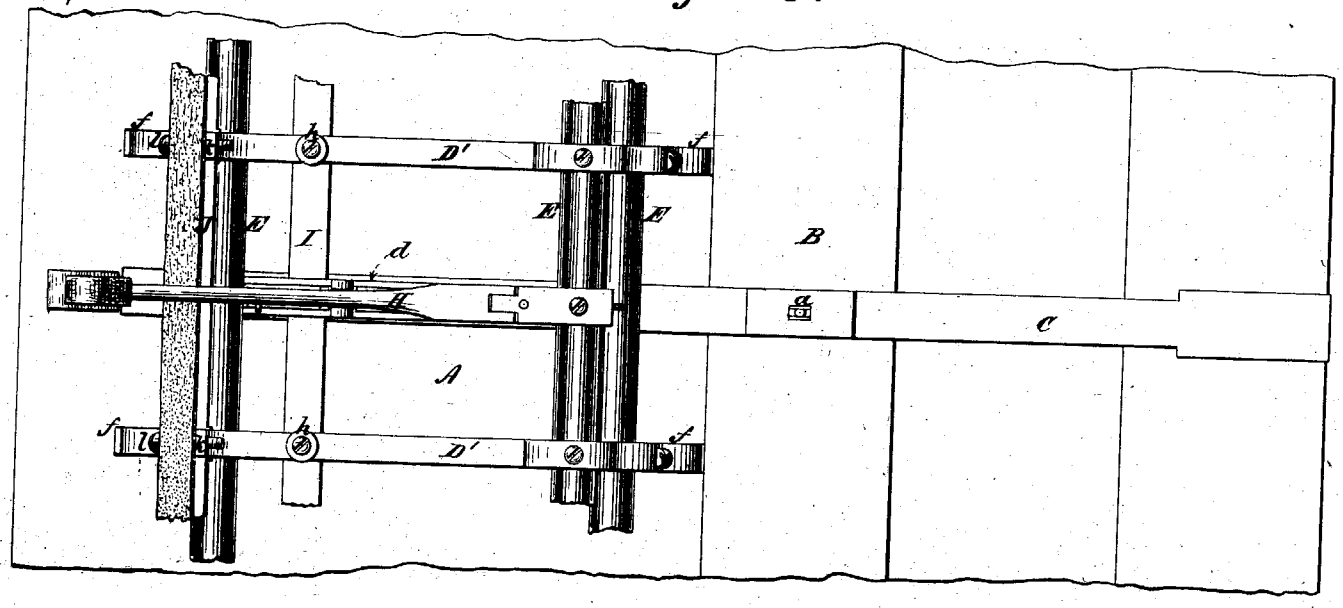
Figure 4:
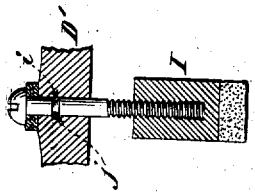

In the accompanying drawings, representing my invention applied to a grand piano-forte action, Figure 1 is a transverse vertical section of the action-frame, affording a side view of one of the standards and one of the trains of mechanism composing the action. Fig. 2 is a rear elevation, and Fig. 3 is a top view, of a portion of the action-frame and one of the trains of mechanism composing the action. Fig. 4 is a vertical section, showing the key-rail and its connection with the standard.

The drawings represent a portion of the bottom A of the key-frame, to which is secured the usual balance-rail B, provided with the balance-pins *a*, which form the guides for the keys C. The connection of the keys with the action is frictional merely, each key being provided with the bearing-piece C′, having the concave socket *b*, for receiving the lower rounded end or foot of the pilot *c*. This pilot is pivoted at its upper end to the intermediate or balance lever, *d*, which carries the jack *e*, by means of which motion is transmitted to the hammer-arm H. If the intermediate lever, *d*, is raised up as far as it will go, the pilot *c* can be forced out of its socket *b*, and the key can be taken out without disturbing the action.

By this arrangement the operation of leveling the keys is materially facilitated, and, furthermore, the action-frame can be secured in position independently of the keys, and if the keys move slightly either toward one side or toward the other under their pilots, their correct action is not impaired.

The action-frame consists of the metallic standards D, to which are fastened the horizontal tubular metallic rails E, upon which the several parts of the action are secured, as shown in the drawings. Each standard is provided with feet *f*, which are perforated to admit the screws *g*, by which the standards are fastened at the bottom upon the top of the wedges F, which rest upon the key-frame.

By moving the wedges F the action-frame may be raised or lowered, and the hammers thus adjusted in the proper position with relation to the strings.

The stroke of the keys is limited by the rail I, which I call the "key-rail" of the action-frame, and which is adjustably suspended from the top bars, D′, of the metallic standards D by means of the vertical screws *h*. Each of these screws passes through a vertical hole in one of the top bars, D′, and is prevented from moving up or down by the pin *j*, which is inserted transversely through the bar D′, and engages the annular groove *i*, formed in the shank of the screw. Under the heads of the screws *h*, I place elastic cushions, which deaden the sound if the keys strike the key-rail.

The rear or inner ends of the standards D are provided with the upwardly-projecting arms *k*, to which the hammer-rail J is secured by means of the screws *l*. These screws are tapped into the arms *k*, and pass through the vertical slots *m* in the hammer-rail, as shown in Fig. 2. This construction permits the rail to be adjusted vertically for the purpose of regulating the striking distance of the hammers, the arms of which bear upon the cushioned upper edge of the rail J when the action is at rest.

By these improvements an action-frame composed of horizontal pieces which are united to vertical standards introduced transversely into the frame at convenient intervals is adapted to be supported upon and secured to the bottom of the key-frame, and the action-frame, with the various trains of mechanism composing the action, is easily removed without disturbing the keys, while on the other hand a key may be taken out without disturbing the action. Moreover, the frame can be easily manipulated and regulated by any person of ordinary mechanical skill, and its parts may be readily interchanged, so that each action-frame can be inserted in either one of all piano-fortes of the same class without requiring fitting.

I distinctly disclaim everything shown and described in my Patent No. 81,306.

I claim as new herein and desire to secure by Letters Patent of the United States—

1. A piano-action frame composed of horizontal pieces united to vertical standards introduced at intervals transversely into the frame, and provided with feet for receiving the fastenings by which the frame is secured in position, substantially as described.

2. The wedges F, arranged under the standards D, substantially as shown, and for the purpose set forth.

3. The pilot *c*, having a rounded lower end or foot, in combination with the key C, having affixed to it the bearing-piece C′, provided with a concave socket, in which the rounded lower end or foot of the pilot is loosely contained, substantially as and for the purposes set forth.

4. The adjusting-screws *h*, loosely inserted through and keyed in the top bars of the metallic standards D, in combination with the key-rail I, substantially as and for the purpose set forth.

5. The arms *k* of the metallic standards D, in combination with the hammer-rail J, provided with vertical slots to admit the screws *l*, by which the rail is adjustably secured to the arms *k*, substantially as set forth.

C. F. THEODOR STEINWAY.

Witnesses:

CHARLES W. MACK,

M. L. ADAMS.